O. B. MOORE.
FRUIT PICKER.
No. 73,989.　　　　　　　　　Patented Feb. 4, 1868.
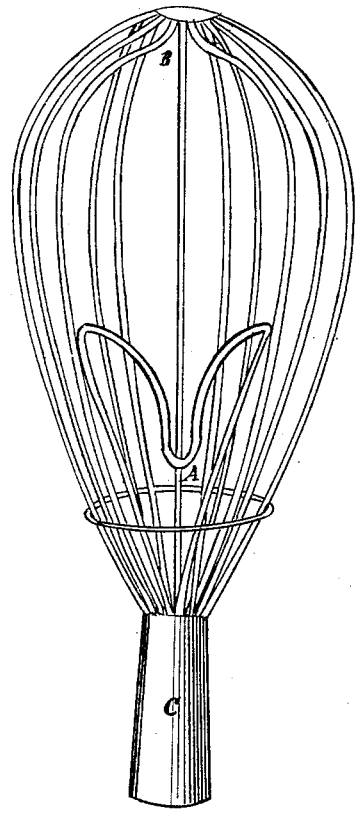
Witnesses-
James R. Donaldson
R. F. Allen
Inventor-
Oel B. Moore.

United States Patent Office.

OEL B. MOORE, OF WALLED LAKE, MICHIGAN.

*Letters Patent No. 73,989, dated February 4, 1868.*

IMPROVEMENT IN FRUIT-PICKERS.

*The Schedule referred to in these Letters Patent and making part of the same.*

TO ALL WHOM IT MAY CONCERN:

Be it known that I, OEL B. MOORE, of Walled Lake, Oakland county, State of Michigan, have invented a new and improved Instrument for Picking Fruit; and I do hereby declare that the following is a clear and exact description of the construction and operation of the same, reference being had to the annexed drawings, making a part of this specification.

The nature of my invention consists in a balloon-shaped instrument, with one side open. In this open side are the loops A and B, so arranged that fruit can be removed from the tree by pushing the instrument up, so that the stem is caught in the loop A, or by pulling down it is caught in the loop B, the fruit dropping inside. The instrument is fastened to a pole by means of the socket C.

What I claim as my invention, and desire to secure by Letters Patent, is—

1. The form of the instrument.
2. The application of the loops A and B.

OEL B. MOORE.

Witnesses:
    JAMES P. DONALDSON.
    R. F. ALLEN.